UNITED STATES PATENT OFFICE.

CHARLES E. SWETT, OF BOSTON, MASSACHUSETTS, ASSIGNOR OF ONE-HALF TO HARRY H. BECKWITH, OF BROOKLINE, MASSACHUSETTS.

PLASTIC COMPOSITION.

1,365,607. Specification of Letters Patent. Patented Jan. 11, 1921.

No Drawing. Application filed December 19, 1919. Serial No. 346,108.

*To all whom it may concern:*

Be it known that I, CHARLES E. SWETT, a citizen of the United States, residing at Boston, in the county of Suffolk and State of Massachusetts, have invented new and useful Improvements in Plastic Composition, of which the following is a specification.

This invention has for its object to provide a composition of matter which is water-repellent and more or less flexible or elastic, so that it may be employed for a variety of purposes in the industrial arts. As will be hereinafter described more in detail, the substance or compound comprises the alcohol-soluble proteid of maize or Indian corn, called zein, a resin and a phenol which is soluble in alcohol. These components are compounded in varying proportions, according to the various uses to which they are to be put, i. e. to produce a moldable material or one available for use as a cement or for use in coating or in impregnating various fibrous fabrics or other forms of manufactured articles.

In preparing the compound, the zein is dissolved in aqueous alcohol, and a natural alcohol-soluble resin and an alcohol-soluble phenol are added thereto in the desired proportions. Any suitable natural resin of the character described may be employed, such, for example, as common rosin, copal or the like, and of the phenols one may use, for example, carbolic acid or cresol. To facilitate the preparation of the compound, the resin may be comminuted, and the phenol may be melted. The mass, resulting from compounding the described components, is resilient or flexible, can be softened by heat and molded, and on cooling resumes its flexibility and resiliency.

When the compound is to be used as a stiffening agent, as in the manufacture of shoe stiffeners wherein a fibrous blank is saturated with the agent, sufficient alcohol is added in preparing the solution to cause it to be readily taken up and absorbed by the fibrous body. When used as a water-repellent coating, the coating may be in the form of a paint. Again, with the desired degree of viscosity, the compound in an alcohol solution may be employed with fragments of mica in building a compound sheet. In such case, when the solvent has evaporated, the sheet may, when warm, be readily molded.

In preparing the compound, the proportions of the components may vary within a wide range. For example, one may have:— zein 10 to 90 parts by weight; resin 10 to 90 parts; phenol 2 to 20 parts; with as much alcohol as may be required to secure the desired viscosity of the solution. Specifically, for use as a stiffening agent for shoe stiffeners, or as a coating or a cement, I have employed, zein 40 parts, rosin 40 parts and phenol 20 parts with as much alcohol as needed.

In the herein described composition of matter, the components are all soluble in alcohol (save that for completely dissolving zein, the alcohol should be slightly aqueous); zein imparts a film-like or shell-like quality thereto; the resin imparts hardness thereto and the capacity to soften by heat, and the phenol acts as a solvent for both zein and resin and largely remains in the finished product.

On the removal of the volatile solvent, the zein, resin and phenol form a homogeneous "solid solution," of which the phenol is the common factor. Consequently the product is more or less elastic, and may, as stated, be placed in condition for molding by the application of heat.

The alcohol, in which the components of the compound are dissolved, is caused to evaporate by exposure to the atmosphere or to a moderate degree of heat, after the solution has been utilized for any of the purposes herein mentioned.

What I claim is:

1. A composition of matter comprising zein, a resin and a phenol compounded together.

2. A composition of matter comprising zein, and a resin and a phenol which are both alcohol-soluble, all compounded together.

3. A composition of matter comprising zein, a resin and a phenol compounded together and dissolved in a common solvent.

4. A composition of matter comprising zein, and a resin and a phenol which are all alcohol-soluble, all compounded together and dissolved in alcohol.

5. A composition of matter comprising by weight zein about 10 to 90 parts; a natural resin about 10 to 90 parts; and a phenol 2 to 20 parts.

6. A composition of matter comprising zein, rosin and carbolic acid compounded together.

7. A composition of matter comprising zein, rosin and carbolic acid compounded together and dissolved in alcohol.

In testimony whereof I have affixed my signature.

CHARLES E. SWETT.